(12) United States Patent
Mormont et al.

(10) Patent No.: US 8,173,556 B2
(45) Date of Patent: *May 8, 2012

(54) PROTECTIVE BARRIER

(75) Inventors: Daniel Mormont, Braine l' Alleud (BE); Alain Jacques, Jambes (BE)

(73) Assignee: Cogebi Societe Anonyme, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 12/700,879

(22) Filed: Feb. 5, 2010

(65) Prior Publication Data

US 2010/0136280 A1    Jun. 3, 2010

Related U.S. Application Data

(63) Continuation of application No. 10/312,214, filed on Dec. 20, 2002, now Pat. No. 7,658,983.

(30) Foreign Application Priority Data

Jun. 21, 2000  (EP) .................................... 00870138
Nov. 13, 2000  (EP) .................................... 00870270

(51) Int. Cl.
   *B32B 5/30*    (2006.01)
(52) U.S. Cl. .............. 442/136; 442/64; 442/65; 442/66; 442/68; 442/70; 442/71; 442/72; 442/74
(58) Field of Classification Search .................... 442/64, 442/65, 66, 68, 70, 71, 72, 74, 136
See application file for complete search history.

(56) References Cited

U.S. PATENT DOCUMENTS

| | | | |
|---|---|---|---|
| 3,001,571 A * | 9/1961 | Hatch ........................ | 428/292.1 |
| 3,618,753 A | 11/1971 | Glasspoole | |
| 3,840,393 A | 10/1974 | Ishizaka et al. | |
| 4,222,802 A | 9/1980 | Sakai et al. | |
| 4,239,998 A | 12/1980 | Hakamada et al. | |
| 4,514,466 A | 4/1985 | Leon, Jr. et al. | |
| 4,769,276 A * | 9/1988 | Gruss et al. .................... | 442/296 |
| 6,627,561 B1 * | 9/2003 | Wulliman et al. ................ | 442/1 |

FOREIGN PATENT DOCUMENTS

| | | |
|---|---|---|
| EP | 001256 A1 | 6/1980 |
| EP | 0040035 A1 | 11/1981 |
| EP | 0373137 A2 | 6/1990 |
| EP | 0406467 A1 | 1/1991 |
| EP | 0406477 A1 | 1/1991 |
| EP | 0949367 A1 | 10/1999 |
| FR | 2384337 | 10/1978 |

OTHER PUBLICATIONS

Mica, Wikipedia Encyclopedia, Wikimedia Foundation, Inc., Apr. 12, 2011.*

* cited by examiner

*Primary Examiner* — Andrew Piziali
(74) *Attorney, Agent, or Firm* — Reinhart Boerner Van Deuren P.C.

(57) ABSTRACT

A protection product has thermal and acoustic barrier characteristics such that it satisfies the requirements of the standard 14 CFR, part 25 issued by the Federal Aviation Administration. The product is designed to be applied along metallic and composite structures, such as aircraft cockpits, boat hulls or the outside structures of trains or of other means of transport. The product is essentially in the form of a "mat" consisting of one or several fibre layers, preferably glass fibres, enclosed in a sheath. The sheath generally comprises at least one first support, preferably made of an organic material having sealing and anti-condensation properties, and an impregnated mica paper. The mica paper preferably has a weight per unit area of less than 50 g/m² and comprises flakes of mica with a form factor greater than 1000.

2 Claims, No Drawings

PROTECTIVE BARRIER

CROSS-REFERENCE TO RELATED PATENT APPLICATIONS

This application is a Continuation of U.S. application No. 10/312,214, filed, Dec. 20, 2002, now U.S. Pat. No. 7,658,983, that claims the benefit of International Application No. PCT/BE01/00107, filed Jun. 21, 2001, that claims the benefit of European Application Nos. 00870138.5 filed, Jun. 21, 2000, and 00870270.6 filed, Nov. 13, 2000, the entire teachings and disclosure of which are incorporated herein by reference thereto.

OBJECT OF THE INVENTION

The present invention relates to a fire protective barrier designed to be applied along the inside of metallic or composite structures, such as aircraft cockpits, boat hulls or other means of transport.

The present invention likewise relates to vehicles such as aircraft, boats, trains etc. that use a fire protective barrier of this kind.

TECHNOLOGICAL BACKGROUND

Metallic and composite structures such as aircraft cockpits or boat hulls are usually covered on the inside with protection having thermal and acoustic barrier characteristics in order to insulate the inside of the cockpit or of the hull from the outside environment.

To this end, proposals have been made for protection systems, which are usually in the form of a mat consisting essentially of one or several layers of glass fibres enclosed in a sheath. This sheath can be produced from any type of material. Preferably, it is a film made of an organic material, such as polyester, polyimide etc. having at least hydrophobic characteristics and acting in certain cases as a water-tight barrier. By way of example, one may mention as a material used to produce the sheath aluminised or unaluminised mylar®, tedlar®, which is produced in a film of PVF, kapton®, which is a film produced from polyimide (registered trademarks of Dupont), or other coverings, such as polyester or polyamide films, such as textril®, which is a polyester film reinforced with polyethylene fibres made by the Jehier company. These films forming the sheath must be produced from materials that allow the customary textile treatments: stitching, bonding, welding etc. and have mechanical characteristics such as resistance to tearing etc.

On the other hand, reflecting a concern to minimise weight, the density of these various materials should be as low as possible while at the same time allowing superior mechanical characteristics to be achieved. The weight per unit area of this type of protection is preferably less than 100 g/m$^2$.

It is absolutely essential to protect as far as possible the passengers inside an aircraft from the risk of ignition of the fuel generally coming from external engines. Indeed, when it ignites, this fuel, such as kerosene, reaches temperatures well above 1000° C. Due to this fact, it is advisable to protect the elements of metallic and composite structures forming aircraft cockpits, boat hulls, outside structures of trains etc.

To this end, the authorities and, in particular, the FAA (Federal Aviation Administration) have established relatively strict fire protection standards. However, the standards to which aircraft manufacturers have to conform are continually evolving and are becoming ever more stringent, reflecting a concern of increased safety of travellers.

The fireproofing characteristics of the protection systems described above, which belong to the prior art, are nowadays found to be inadequate. The transport department of the FAA has therefore attempted to publish test criteria appropriate to the new requirements. In particular, the characteristics of resistance to the "burn-through test" and the "inflammability test" were redefined in September 2000 in standard 14 CFR, part 25 et al.

In particular, the "burn-through" test consists in subjecting the mat of fibres and its sheath to the flame of a burner. The said burner supplies an impinging flame at a temperature of around 1150° C. The sample is thus subjected to a heat flux of 149 kW/m$^2$. The product concerned will satisfy the requirements of the FAA if it succeeds in resisting penetration by the said flame for 4 minutes and if the heat flux produced by the sample is less than 23 kW/m$^2$, measured at a distance of 30.5 cm (12 inches) from the impingement surface.

The inflammability test (ASTM-E 648), which consists in subjecting a sample measuring 1000 mm in length and 250 mm in width to a radiant panel sloping at 30° in front of the sample and in the presence of a pilot flame. The radiant panel produces a heat flux of 18 kW/m$^2$ and ignition is effected by means of a pilot flame. The criteria for passing the test are the absence of flames within a radius of 51 mm around the point of application and the absence of post-combustion after extinction of the pilot flame for a specific test period.

Aircraft manufacturers have likewise defined certain mechanical specifications, such as flexibility and tensile strength, and their variation, obtained as a result of standardised conditioning or ageing of the samples.

On the other hand, the prior art, in particular the document EP-A-0370337, has disclosed the use of an impregnated mica paper, possibly bonded to a support based on woven or non-woven glass fibres, aramid fibres, carbon fibres or some other type, such as a fireproofing covering with a low rate of heat release for construction elements in applications subject to relatively stringent standards in this matter, such as the aeronautical industry, the automotive industry, interior decoration etc.

Although this type of use for mica paper initially satisfied the standards in force in the 1980s (ATS 10 333-001, directive FAR 25—OSU chamber), this type of covering does not satisfy the new safety standards, such as those defined above.

It is likewise known, in particular from the documents EP-A-0949367, FR-A-2 384 337, EP-A-0406467 and US-4 514 466, that mica and, in particular, mica paper is a good electrical insulator and has good heat resistance. Nevertheless, these documents do not mention the use of mica for a fire protective barrier applied along a metallic or composite structure such as an aircraft cockpit, a boat hull or the outside structure of a train etc.

It will furthermore be noted that, in all the prior-art applications, the conventional mica paper has a weight per unit area close to 100 g/m$^2$.

Aims of the Invention

The present invention aims to propose a protection product which has at least the same acoustic and thermal insulation characteristics as the prior-art products and equivalent behaviour as an anti-condensation barrier.

In particular, the present invention aims to propose a product for use as a fireproofing barrier which satisfies the new requirements of the FAA, that is to say which meets the standards defined by regulation 14 CFR, part 25.

More particularly, the present invention aims to propose a protection product which has satisfactory behaviour in the "burn-through" test and in the inflammability test, which are defined in this regulation.

Moreover, the present invention aims to allow solutions which increase the ultimate weight of the material as little as possible, that is to say which allow the provision of a sheath that has a total weight per unit area of less than 100 g/m².

Main Characteristic Elements of the Invention

The present invention relates to a protection product having thermal and acoustic barrier characteristics designed to be applied along metallic and composite structures, such as aircraft cockpits, boat hulls or train structures, essentially in the form of a mat consisting of one or several fibre layers, preferably glass fibres, enclosed in a sheath, characterised in that the sheath comprises at least one first support having moisture-tightness and anticondensation characteristics and preferably made of an organic material, and an impregnated mica paper.

According to a first embodiment, the sheath comprising the mica paper and the first support is produced in the form of a single layer, in which the mica paper adheres directly to the support.

According to a second embodiment, the sheath is in the form of a multi-layer complex comprising, on the one hand, the support having the required moisture-tightness and anticondensation characteristics and, on the other hand, a mica paper, possibly adhering to a second, dedicated support.

The mica paper is advantageously laminated to a second, dedicated support, preferably to a fabric support such as glass silk or a film.

The first support is advantageously a film or a fabric.

The weight of the mica paper per unit area is preferably less than 50 g/m²; preferably less than 45 g/m²; preferably less than 40 g/m²; preferably less than 35 g/m²; and preferably less than 30 g/m². It is particularly preferred that the weight of the mica paper per unit area is less than 25 g/m² and preferably less than 20 g/m².

Finally, the present invention relates to a metallic or composite structure such as an aircraft cockpit, a boat hull or the outside structure of a train, to which the product according to the invention is applied.

It is particularly surprising that the use of such thin mica paper, that is to say with a weight per unit area of less than 50 g/m², has completely satisfactory characteristics, complying with the anti-inflammability and "burn-through" tests.

It is highly probable that the reason for this is that, to produce such papers, it is necessary to use a pulp of mica flakes of which 90% by volume will be less than 800 μm in size. Moreover, these flakes will preferably have a large form factor (that is to say diameter divided by thickness), and preferably a form factor greater than 1000. It should be noted that the mica paper will be produced by customary techniques described in the prior art and impregnated with different types of resin, e.g. silicone.

DETAILED DESCRIPTION OF THE INVENTION

The present invention will be described in greater detail with reference to the examples which follow. In these examples, a "mica paper" produced by conventional techniques is used in each case.

The term "mica paper" is intended to mean a sheet produced by the usual papermaking techniques, which comprises 100% mica in the form of directional flakes. The flakes are usually either of the phlogopite or calcined or uncalcined muscovite type, or are in the form of a mixture of the two, or of the fluorophlogopite type, when synthetic mica is used.

The general technique consists in reducing "scraps" of mica to the state of flakes, the "scraps" being the physical form in which mica ore is extracted from mines. This can be achieved, for example, by mechanical disintegration with water and processing of the pulp thus obtained on a machine similar to papermaking machines in order to make a mica paper. Currently, there are several types of mica paper on the market. These depend essentially on the nature of the ore. Muscovite mica papers consisting entirely of calcined or uncalcined muscovite mica ore, phlogopite mica paper consisting entirely of phlogopite mica ore and mica papers produced from a mixture of different ores are known. In certain cases, vermiculite is furthermore used, being added to other materials to make mica paper.

The use of synthetic mica to create a mica paper is also known.

This mica paper is used as a primary material for the manufacture of tapes, sheets, laminates (micanite). To do this, the mica paper is usually impregnated with organic binders (resins) or inorganic binders and/or bonded to a mechanically strong flexible support in order to confer the desired physical properties on the end product.

The level of impregnation of mica papers with organic binders and, in particular, with silicone resins, is usually between 5 and 25%.

The originality of the mica paper used according to the present invention resides in the fact that its weight per unit area is relatively low and preferably less than 50 g/m².

On the other hand, a glass fibre felt will be produced in a conventional manner and wrapped in a sheath consisting of at least one textile support and a mica paper according to the present invention. The sheath is referred to below as the finished product.

According to a first embodiment, the said finished product can be in a multi-layer form, that is to say that, in a conventional manner, it comprises a film of organic material having hydrophobic characteristics and acting as a water-tight and vapour-tight barrier, and a mica paper, possibly attached to a dedicated support.

According to another embodiment, the said finished product can be in a single-layer form and consist of a mica paper laminated directly onto a film having the required hydrophobic characteristics.

EXAMPLE 1

A finished product intended for the production of the sheath is produced, comprising a mica paper, a textile support and a resin. To this end, the following constituents are used:

- a muscovite mica paper with a weight per unit area of 25 g/m²,
- a glass fabric with a weight per unit area of 24 g/m² formed by 26 warp yarns/cm and 15 weft yarns/cm, the titer of the yarns being 5.5 tex in both the warp and weft yarns, and
- a silicone resin of the phenylmethyl silicone type, such as the resin D.C. 805 from the Dow Corning company.

The mica paper used consists of flakes of muscovite mica and is defined by the following particle distribution: 90% by volume are less than 800 μm in size and 10% by volume are less than 80 μm in size. Moreover, their form factor will be greater than 1000. The characteristics of the mica paper are as follows:

weight per unit area: 25 g/m²
thickness: 0.016 mm
tensile strength: 4 N/cm
air porosity: 2200 s/100 cm³
oil penetration: 4 s.

To produce the finished product, the glass fibre fabric is impregnated with a solution of silicone resin in a toluene solvent medium containing 15% dissolved solids. The mica paper is positioned directly on the impregnated glass fibre fabric. This then absorbs a part of the resin. After evaporation of the solvent in drying ovens provided for this purpose, the product obtained is rolled up.

In this way, a product consisting of a mica paper laminated onto a glass fibre fabric is produced.

The finished product has the following characteristics:
total weight: 60 g/m$^2$
thickness: 0.059 mm
binder content: 20%
content of volatiles: 0.2%
IEC flexibility: 9 N/m
tensile strength: 104 N/cm
dielectric strength: 1.08 KV/layer When the product is subjected to ageing tests corresponding to the EADS Airbus specification, the following results are obtained for materials intended to meet the specifications of the "burn-through" test after conditioning at 70° C./98% relative humidity for 500 hours:
total variation in mass: −0.35%
variation in tensile strength: −4%

These values are well below the limits specified by EADS Airbus, which accepts a loss of up to 10% in these same properties.

A sample is then subjected to a flame test as described below:
three samples of the product are conditioned at ambient temperature and 50% relative humidity for a minimum of 24 hours,
a sample measuring 18 cm×18 cm is fixed by its four sides on a metallic frame with a width of 1 cm, leaving a very slightly tensioned square surface area of 17 cm×17 cm,
the sample is exposed horizontally to the flame of a bunsen burner with a 1-cm diameter nozzle. The total height of the flame should be 4 cm and the sample should be placed between the oxidising and the reducing limit of the flame. This gives a contact temperature between the flame and the sample of 1100° C.,
the flame is applied to the sample for 10 minutes, and
a check is made to ensure that the flame does not pass through the sample throughout the test.

The same method is employed for all three samples. If none of the samples as described in this example has been passed through by the flame after 10 minutes of testing, the product fulfils its role of flame protection perfectly. Even after having extended the tests by 30 minutes, the mica paper/glass fibre fabric product is not pierced by the flame.

"Burn-through" tests according to the standard CFR 14, part 25 were performed on an insulating mat consisting of two layers of glass fibres, a fire barrier consisting of a sheet of mica/glass fibre fabric product as described above, and a skin of reinforced polyester. After the 4 minutes required for the test, the mica has not been perforated by the flame and the heat flux levels measured are less than 0.8 W/cm$^2$ and have thus remained well below the maximum value accepted in the specification of the standard, which is 2 W/cm$^2$. The product thus complies with standard 14 CFR, part 25.

EXAMPLE 2

A finished product intended to form the sheath consisting of a mica paper, a support, a resin and an adhesive is produced. To this end, use is made of the following materials:
a muscovite mica paper weighing 20 g/m$^2$,
a polyvinylfluoride (PVF) film such as Tedlar® TFM05AL2 from Dupont de Nemours with a thickness of 12.5μ and a weight of 18 g/m$^2$,
a silicone resin of the methyl silicone type, such as the resin Wacker K from the Wacker company, and
a silicone adhesive of the PSA (Pressure Sensitive Adhesive) type, such as the type DC 280 A from the Dow Corning company.

The mica paper used is of the same type as that used in example 1 and has the following characteristics:
weight per unit area: 20 g/m$^2$
thickness: 0.014 mm
tensile strength: 3 N/cm
air porosity: 2000 s/100 cm$^3$
oil penetration: 4 s.

To produce the finished product, two steps are performed:
1. a step in which the mica paper is reinforced: to do this, the mica paper is impregnated with a 10% solution of silicone resin K in a solvent medium, and a mica paper reinforced with 9% of dry silicone resin is obtained, and
2. a laminating step, which can be performed in an advantageous manner by two different techniques:
    a. the previously reinforced mica paper is coated with a 14% solution of silicone adhesive 280A in a solvent medium. After evaporation of the solvent in drying ovens, a PVF film is laminated onto the mica coated with the silicone adhesive;
    b. or the PVF film is coated with a 5% solution of silicone adhesive 280A in a solvent medium. After evaporation of the solvent in drying ovens, the previously reinforced mica paper is laminated onto the PVF film coated with the silicone adhesive.

A product made up of a mica paper laminated onto a PVF film is obtained in this way. The finished product has the following characteristics:
total weight: 48 g/m
thickness: 0.050 mm
binder content: 20%
content of volatiles: 0.2%

The results of the ageing tests under humid conditions as specified in the first example meet the EADS specifications.

In the flame tests as described in example 1, an excellent result is likewise obtained inasmuch as the flame does not pass through the mica paper/Tedlar® film product after the 10 minutes of testing.

EXAMPLE 3

A variant of the product is produced by the same method as that described in example 2, but replacing the Tedlar® PVF film with a 6-μ Mylar® polyester film obtained from the Dupont de Nemours company.

The results obtained are comparable to those in the preceding examples.

EXAMPLE 4

Another method of implementation consists in bonding the film onto the mica paper by means of spots of adhesive rather than by means of a continuous film of adhesive. To do this, use is made of well-known coating techniques, e.g. coating by means of an engraved cylinder, which makes it possible to deposit the adhesive in the form of spots on the support.

The invention claimed is:
1. A protection product having thermal and acoustic barrier characteristics such that the product satisfies the requirements of the standard set forth in 14 CFR, part 25 by the Federal

Aviation Administration, as amended in September 2000, the product being designed to be applied along metallic and composite structures, said protection product being essentially in the form of a mat comprising one or several fibre layers enclosed in a sheath, wherein the sheath comprises: at least one first support, and an impregnated mica paper, the mica paper having a weight per unit area of less 40 g/m$^2$ and comprising flakes of mica with a form factor greater than 1000, wherein the impregnated micra paper consists essentially of mica and a binder or resin, and wherein the protection product comprising the impregnated mica paper satisfies said requirements of the standard set forth in 14 CFR, part 25.

2. A protection product having thermal and acoustic barrier characteristics such that the product satisfies the requirements of the standard set forth in 14 CFR, part 25 by the Federal Aviation Administration, as amended in September 2000, the product being designed to be applied along metallic and composite structures, said protection product being essentially in the form of a mat comprising one or several fibre layers enclosed in a sheath, wherein the sheath comprises: at least one first support, and an impregnated mica paper, the mica paper having a weight per unit area of less 35 g/m$^2$ and comprising flakes of mica with a form factor greater than 1000, wherein the impregnated micra paper consists essentially of mica and a binder or resin, and wherein the protection product comprising the impregnated mica paper satisfies said requirements of the standard set forth in 14 CFR, part 25.

* * * * *